US009215450B2

(12) United States Patent
Lee et al.

(10) Patent No.: US 9,215,450 B2
(45) Date of Patent: Dec. 15, 2015

(54) AUTO-STEREOSCOPIC THREE-DIMENSIONAL DISPLAY AND DRIVING METHOD THEREOF

(71) Applicant: Hannstar Display Corporation, New Taipei (TW)

(72) Inventors: Chih-Hsuan Lee, Tainan (TW); Ya-Wen Lee, Tainan (TW); Chun-Chin Tseng, Kaohsiung (TW)

(73) Assignee: HannStar Display Corporation, Taipei (TW)

( * ) Notice: Subject to any disclaimer, the term of this patent is extended or adjusted under 35 U.S.C. 154(b) by 277 days.

(21) Appl. No.: 13/936,222

(22) Filed: Jul. 8, 2013

(65) Prior Publication Data

US 2014/0043448 A1 Feb. 13, 2014

(30) Foreign Application Priority Data

Aug. 9, 2012 (CN) .......................... 2012 1 0283057

(51) Int. Cl.
| | |
|---|---|
| *H04N 13/00* | (2006.01) |
| *H04N 13/04* | (2006.01) |
| *G09G 3/00* | (2006.01) |
| *G02F 1/13* | (2006.01) |
| *G02F 1/1335* | (2006.01) |
| *G02F 1/136* | (2006.01) |

(52) U.S. Cl.
CPC ........... *H04N 13/0409* (2013.01); *G09G 3/003* (2013.01); *H04N 13/0413* (2013.01); *H04N 13/0497* (2013.01); *G09G 2320/0209* (2013.01)

(58) Field of Classification Search
USPC ............................... 348/42, 51; 349/1, 15, 47
See application file for complete search history.

(56) References Cited

U.S. PATENT DOCUMENTS

2013/0088479 A1* 4/2013 Kim et al. ...................... 345/212
2013/0208195 A1* 8/2013 Cho et al. ........................ 349/15

* cited by examiner

*Primary Examiner* — Daquan Zhao
(74) *Attorney, Agent, or Firm* — Jianq Chyun IP Office

(57) ABSTRACT

An auto-stereoscopic three-dimensional (3D) display including a display module and a driving module is provided. The display module includes a display panel and a barrier unit. The display panel has odd-column pixels and even-column pixels. The barrier unit coordinates with a left-eye image and a right-eye image displayed by the display panel to switch vertically and alternatively arranged slits and barriers, so as to produce a stereoscopic image in a viewer's eyes through parallax. The driving module provides left-eye image data and right-eye image data to drive the display module. The driving module drives the odd-column and even-column pixels respectively according to different driving timings, so as to respectively and sequentially enables the odd-column and even-column pixels during a plurality of corresponding frame periods to receive the left-eye image data and the right-eye image data and allow the display panel to display the left-eye and right-eye images.

16 Claims, 11 Drawing Sheets

AUTO-STEREOSCOPIC THREE-DIMENSIONAL DISPLAY AND DRIVING METHOD THEREOF

CROSS-REFERENCE TO RELATED APPLICATION

This application claims the priority benefit of China application serial no. 201210283057.8, filed on Aug. 9, 2012. The entirety of the above-mentioned patent application is hereby incorporated by reference herein and made a part of this specification.

BACKGROUND OF THE INVENTION

1. Field of the Invention

The invention generally relates to a display and a driving method thereof, and more particularly, to an auto-stereoscopic three-dimensional (3D) display and a driving method thereof.

2. Description of Related Art

Along with the development of technologies, flat panel displays have been gradually replaced by three-dimensional (3D) displays in order to bring a more intuitive and enjoyable experience to the viewers. The development direction of today's 3D display technologies is to present stereoscopic and lifelike images.

Existing 3D displays can be roughly categorized into stereoscopic 3D displays and auto-stereoscopic 3D displays. The difference between these two types of 3D displays is that when a viewer views images displayed on a stereoscopic 3D display, the viewer needs to wear a pair of specially designed stereoscopic glasses to experience the 3D effect, while when the viewer views images displayed on an auto-stereoscopic 3D display, the viewer can sense the 3D effect by directly looking at the images. Since the stereoscopic 3D display techniques require the viewers to wear stereoscopic glasses to view stereoscopic images, the viewers may feel inconvenient. Besides, dizziness and other discomforts may be sensed if a viewer wears stereoscopic glasses for a long time. Thereby, the auto-stereoscopic 3D display technology is evolving and becoming the mainstream 3D display technology.

In an auto-stereoscopic 3D display, stereoscopic images are usually produced through parallax stereogram. In the parallax stereogram technique, an image presented to a viewer's left and right eyes is vertically cut in unit of pixel columns A new image is then generated by re-arranging the odd and even pixel columns of the original image. When the new image is displayed, a parallax barrier is added in front of the new image. Through the shielding effect of parallel grating strips, the left eye and the right eye can respectively see a left-eye image and a right-eye image in the re-arranged image, so that a stereoscopic image can be perceived by the viewer's brain.

However, in a general auto-stereoscopic 3D display, to display an interlaced image on the display panel, corresponding image data for driving the display panel has to be generated through software processing. Due to the extra image processing step, the efficiency of the auto-stereoscopic 3D display is reduced. Besides, because an external host can only display stereoscopic images on the auto-stereoscopic 3D display when the processing software is installed in the host, the compatibility between the auto-stereoscopic 3D display and the host is restricted.

SUMMARY OF THE INVENTION

Accordingly, the invention is directed to an auto-stereoscopic three-dimensional (3D) display, in which a display panel is driven by gate drivers respectively corresponding to odd-column pixels and even-column pixels, so that the odd-column pixels and the even-column pixels can respectively receive and display corresponding image data.

The invention is also directed to a driving method of an auto-stereoscopic 3D display, in which odd-column pixels and even-column pixels are driven respectively according to different driving timings, so that the odd-column pixels and the even-column pixels can respectively receive and display corresponding image data.

The invention provides an auto-stereoscopic 3D display including a display module and a driving module. The display module includes a display panel and a barrier unit. The display panel has a plurality of odd-column pixels and a plurality of even-column pixels. The barrier unit coordinates with a left-eye image and a right-eye image displayed by the display panel to switch a plurality of vertically and alternatively arranged slits and barriers, so as to produce a stereoscopic image in a viewer's eyes through parallax. The driving module is coupled to the display module. The driving module provides a plurality of left-eye image data and a plurality of right-eye image data to drive the display module. The driving module drives the odd-column pixels and the even-column pixels respectively according to different driving timings to respectively and sequentially enable the odd-column pixels and the even-column pixels during a plurality of corresponding frame periods, so as to receive the left-eye image data and the right-eye image data and allow the display panel to display the left-eye image and the right-eye image.

According to an embodiment of the invention, the frame periods include a first frame period and a second frame period. The driving module sequentially enables the odd-column pixels and disables the even-column pixels during the first frame period to allow the odd-column pixels to sequentially receive the left-eye image data and allow the display panel to display the left-eye image according to the left-eye image data during the first frame period, so as to allow the barrier unit to coordinate with the left-eye image to switch the slits and barriers and allow the display module to project the left-eye image to a left-eye area during the first frame period. The driving module disables the odd-column pixels and sequentially enables the even-column pixels during the second frame period to allow the even-column pixels to sequentially receive the right-eye image data and allow the display panel to display the right-eye image according to the right-eye image data during the second frame period, so as to allow the barrier unit to coordinate with the right-eye image to switch the slits and barriers and allow the display module to project the right-eye image to a right-eye area during the second frame period.

According to an embodiment of the invention, the driving module includes a timing controller, a first gate driver, a second gate driver, and a source driver. The timing controller generates at least one left-eye image start signal, at least one right-eye image start signal, at least one left-eye image clock signal, and at least one right-eye image clock signal. The first gate driver is coupled to the odd-column pixels and the timing controller. The first gate driver sequentially enables the odd-column pixels according to the left-eye image start signal and the left-eye image clock signal. The second gate driver is coupled to the even-column pixels and the timing controller. The second gate driver sequentially enables the even-column pixels according to the right-eye image start signal and the right-eye image clock signal. The source driver is coupled to the timing controller. The source driver outputs the left-eye image data to the odd-column pixels according to the left-eye image clock signal and outputs the right-eye image data to the even-column pixels according to the right-eye image clock signal.

According to an embodiment of the invention, the at least one left-eye image start signal includes a first start signal and a second start signal, and the at least one left-eye image clock signal includes a first clock signal, a second clock signal, a third clock signal, and a fourth clock signal. The timing controller generates the first clock signal and the third clock signal according to the first start signal. The timing controller generates the second clock signal and the fourth clock signal according to the second start signal.

According to an embodiment of the invention, the odd-column pixels include a first odd-column pixel, a second odd-column pixel, a third odd-column pixel, and a fourth odd-column pixel. The first gate driver sequentially enables the first odd-column pixel according to the first clock signal, enables the second odd-column pixel according to the second clock signal, enables the third odd-column pixel according to the third clock signal, and enables the fourth odd-column pixel according to the fourth clock signal during the first frame period.

According to an embodiment of the invention, the at least one right-eye image start signal includes a third start signal and a fourth start signal, and the at least one right-eye image clock signal includes a fifth clock signal, a sixth clock signal, a seventh clock signal, and an eighth clock signal. The timing controller generates the fifth clock signal and the seventh clock signal according to the third start signal. The timing controller generates the sixth clock signal and the eighth clock signal according to the fourth start signal.

According to an embodiment of the invention, the even-column pixels include a first even-column pixel, a second even-column pixel, a third even-column pixel, and a fourth even-column pixel. The second gate driver sequentially enables the first even-column pixel according to the fifth clock signal, enables the second even-column pixel according to the sixth clock signal, enables the third even-column pixel according to the seventh clock signal, and enables the fourth even-column pixel according to the eighth clock signal during the second frame period.

According to an embodiment of the invention, the first gate driver and the second gate driver are a gate-driver on array.

According to an embodiment of the invention, each of the odd-column pixels and each of the even-column pixels respectively include a plurality of pixels. Each of the pixels includes a first sub-pixel, a second sub-pixel, and a third sub-pixel. The first sub-pixel has a first color resistor, the second sub-pixel has a second color resistor, and the third sub-pixel has a third color resistor. The first sub-pixel, the second sub-pixel, and the third sub-pixel are sequentially arranged along a column direction of the odd-column pixels and the even-column pixels.

The invention provides a driving method of an auto-stereoscopic 3D display. The auto-stereoscopic 3D display includes a display module, and the display module includes a display panel and a barrier unit. The driving method includes following steps. A plurality of odd-column pixels and a plurality of even-column pixels are driven respectively according to different driving timings to respectively and sequentially enable the odd-column pixels and the even-column pixels during a plurality of corresponding frame periods, so as to allow the odd-column pixels and the even-column pixels to receive a plurality of left-eye image data and a plurality of right-eye image data. A left-eye image and a right-eye image are displayed on the display panel according to the left-eye image data and the right-eye image data. The barrier unit is coordinated with the left-eye image and the right-eye image displayed on the display panel to switch a plurality of vertically and alternatively arranged slits and barriers, so as to produce a stereoscopic image in a viewer's eyes through parallax.

According to an embodiment of the invention, the frame periods include a first frame period and a second frame period, and the step of driving the odd-column pixels and the even-column pixels respectively according to different driving timings further includes following steps. During the first frame period, the odd-column pixels are sequentially enabled, and the even-column pixels are disabled, so as to allow the odd-column pixels to sequentially receive the left-eye image data. During the second frame period, the odd-column pixels are disabled, and the even-column pixels are sequentially enabled, so as to allow the even-column pixels to sequentially receive the right-eye image data.

According to an embodiment of the invention, the step of during the first frame period, sequentially enabling the odd-column pixels and disabling the even-column pixels includes sequentially enabling the odd-column pixels according to at least one left-eye image start signal and at least one left-eye image clock signal.

According to an embodiment of the invention, the odd-column pixels include a first odd-column pixel, a second odd-column pixel, a third odd-column pixel, and a fourth odd-column pixel. The at least one left-eye image start signal includes a first start signal and a second start signal. The at least one left-eye image clock signal includes a first clock signal, a second clock signal, a third clock signal, and a fourth clock signal. The step of sequentially enabling the odd-column pixels according to the at least one left-eye image start signal and the at least one left-eye image clock signal during the first frame period includes enabling the first odd-column pixel according to the first clock signal, enabling the second odd-column pixel according to the second clock signal, enabling the third odd-column pixel according to the third clock signal, and enabling the fourth odd-column pixel according to the fourth clock signal. The first clock signal and the third clock signal are generated according to the first start signal, and the second clock signal and the fourth clock signal are generated according to the second start signal.

According to an embodiment of the invention, the step of disabling the odd-column pixels and sequentially enabling the even-column pixels during the second frame period includes sequentially enabling the even-column pixels according to at least one right-eye image start signal and at least one right-eye image clock signal.

According to an embodiment of the invention, a fifth clock signal and a seventh clock signal are generated according to a third start signal, and a sixth clock signal and an eighth clock signal are generated according to a fourth start signal.

According to an embodiment of the invention, the even-column pixels include a first even-column pixel, a second even-column pixel, a third even-column pixel, and a fourth even-column pixel. The at least one right-eye image start signal includes a third start signal and a fourth start signal. The at least one right-eye image clock signal includes the fifth clock signal, the sixth clock signal, the seventh clock signal, and the eighth clock signal. The step of sequentially enabling the even-column pixels according to the at least one right-eye image start signal and the at least one right-eye image clock signal during the second frame period includes enabling the first even-column pixel according to the fifth clock signal, enabling the second even-column pixel according to the sixth clock signal, enabling the third even-column pixel according to the seventh clock signal, and enabling the fourth even-column pixel according to the eighth clock signal.

According to an embodiment of the invention, the step of displaying the left-eye image and the right-eye image on the display panel respectively according to the left-eye image data and the right-eye image data includes displaying the left-eye image on the display panel according to the left-eye image data during the first frame period and displaying the right-eye image on the display panel according to the right-eye image data during the second frame period.

According to an embodiment of the invention, the step of coordinating the barrier unit with the left-eye image and the right-eye image displayed on the display panel to switch the slits and barriers, so as to produce the stereoscopic image in the viewer's eyes through parallax further includes following steps. The barrier unit is coordinated with the left-eye image to switch the slits and barriers, so as to allow the display module to project the left-eye image to a left-eye area during the first frame period. The barrier unit is coordinated with the right-eye image to switch the slits and barriers, so as to allow the display module to project the right-eye image to a right-eye area during the second frame period.

As described above, embodiments of the invention provide an auto-stereoscopic 3D display and a driving method thereof. In the driving method, odd-column pixels and even-column pixels are driven respectively according to different driving timings. Thus, no software for synthesizing left-eye image and right eye image is required, and a display panel of the auto-stereoscopic 3D display can directly generate an image format for displaying stereoscopic images, so that high hardware compatibility is achieved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
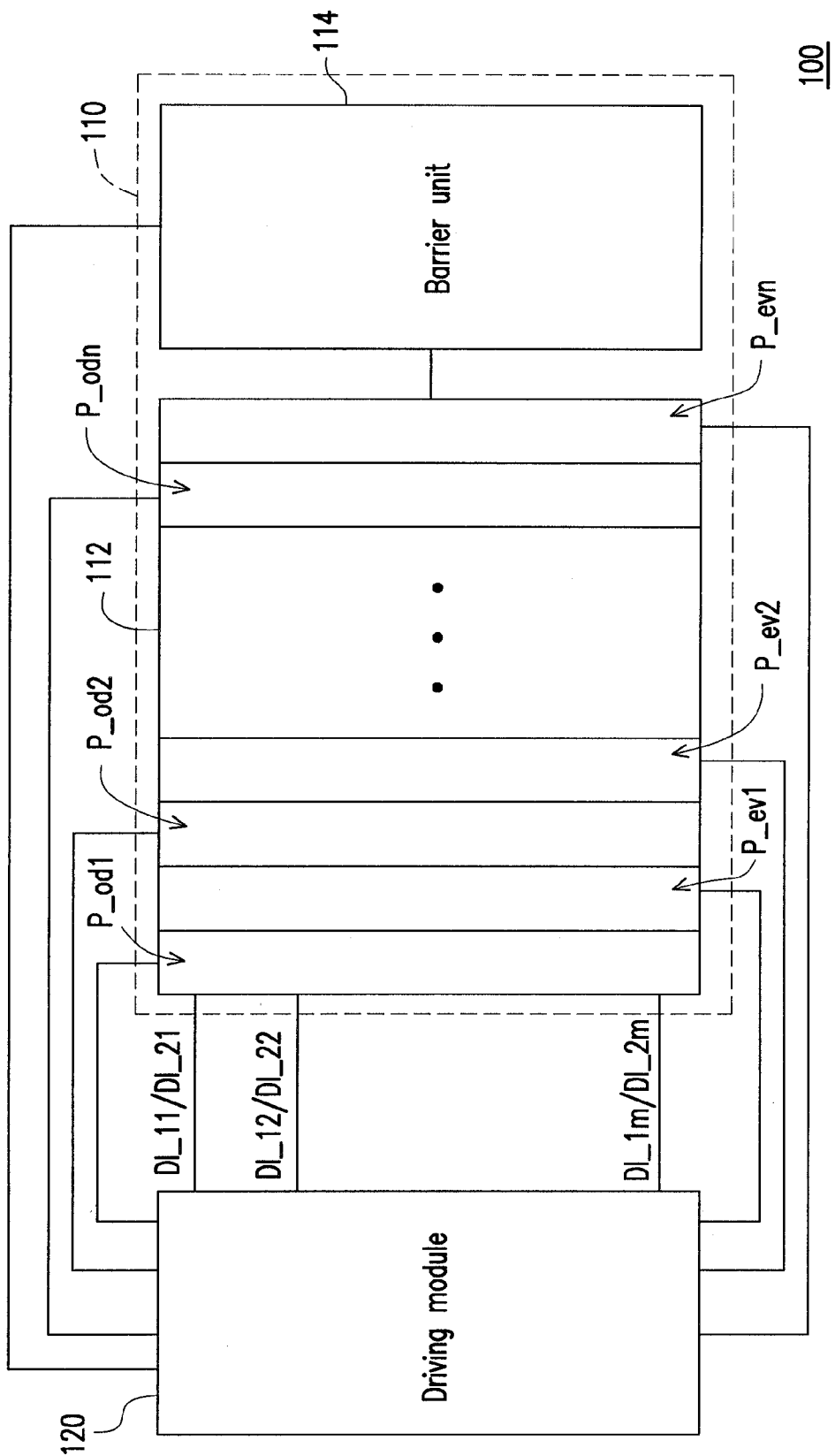
FIG. 1 is a diagram of an auto-stereoscopic three-dimensional (3D) display according to an embodiment of the invention.

Embodiments of the invention provide an auto-stereoscopic three-dimensional (3D) display and a driving method thereof, in which no software for synthesizing left- and right-eye images is required, and the display panel generates an image format for displaying stereoscopic images according to driving timings provided by a driving module, so that high hardware compatibility is achieved. Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of an auto-stereoscopic 3D display according to an embodiment of the invention. Referring to FIG. 1, the auto-stereoscopic 3D display 100 includes a display module 110 and a driving module 120. The display module 110 includes a display panel 112 and a barrier unit 114. The display panel 112 has a plurality of odd-column pixels P_od1-P_odn and a plurality of even-column pixels P_ev1-P_evn, wherein n is a positive integer. The barrier unit 114 coordinates with a left-eye image and a right-eye image displayed by the display panel 112 to switch a plurality of vertically and alternatively arranged slits and barriers, so as to produce a stereoscopic image in a viewer's eyes through parallax.

The driving module 120 is coupled to the display module 110. The driving module 120 provides left-eye image data DI_11-DI_1m and right-eye image data DI_21-DI_2m to drive the display module 110. Herein m is a positive integer and is determined according to the pixel arrangement on the display panel 112. However, the invention is not limited thereto.

In the present embodiment, the driving module 120 drives the odd-column pixels P_od1-P_odn and the even-column pixels P_ev1-P_evn respectively according to different driving timings, so that the odd-column pixels P_od1-P_odn and the even-column pixels P_ev1-P_evn are respectively and sequentially enabled to receive the left-eye image data DI_11-DI_1m and the right-eye image data DI_21-DI_2m during corresponding frame periods, and accordingly the display panel 112 can display the left-eye image and the right-eye image.

It should be noted that in an actual display module 110, the barrier unit 114 may be disposed on top of or below the display panel 112. The barrier unit 114 illustrated in FIG. 1 is only an example but not intended to limit the disposition thereof in the display module 110. The disposition of the barrier unit 114 in the display module 110 can be referred to FIG. 2, FIG. 3, and related descriptions.

Figure 2:
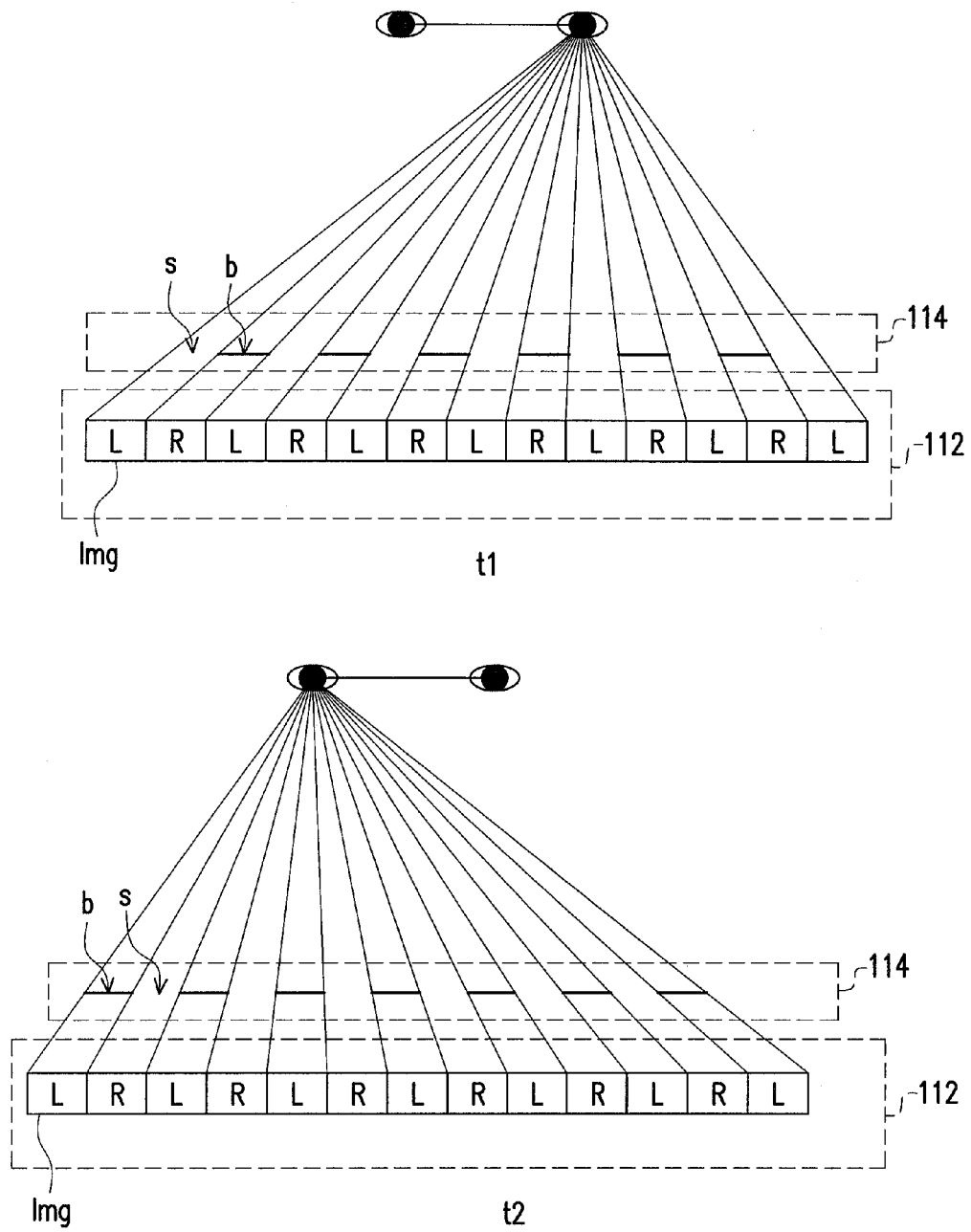
FIG. 2 is a stereoscopic imaging diagram of the auto-stereoscopic 3D display in FIG. 1.

FIG. 2 is a stereoscopic imaging diagram of the auto-stereoscopic 3D display in FIG. 1. Referring to FIG. 2, the barrier unit 114 is illustrated as a parallax barrier. However, the invention is not limited thereto. In the present embodiment, a plurality of slits and barriers (for example, slits s and barriers b) is switched to shield part of the light source, so that the light beam is projected to areas at fixed angles and accordingly a left-eye image and a right-eye image are respectively received by a viewer's left and right eyes. However, the invention is not limited thereto, and the barrier unit 114 may also be implemented by using a lenticular array, such that the stereoscopic imaging effect can be achieved by altering the refraction angle of the light beam.

To be specific, referring to both FIG. 1 and FIG. 2, according to the stereoscopic imaging principle of the auto-stereoscopic 3D display 100, the driving timings of an original left-eye image L and an original right-eye image R respectively generated by the display panel 112 according to the left-eye image data DI_11-DI_1m and the right-eye image data DI_21-DI_2m are coordinated by the barrier unit 114 to synchronously switch the slits and barriers and shield light in specific directions. Thus, the original left-eye image L and the original right-eye image R are respectively projected by the display module 110 to areas corresponding to the viewer's left and right eyes, so that the viewer can perceive the image displayed by the auto-stereoscopic 3D display 100 as a stereoscopic image through parallax.

For example, at a time t1, the barrier unit 114 shields the pixels for displaying the original right-eye image R on the display panel 112 according to the driving timing. Herein the display panel 112 projects the left-eye image to the left eye of the viewer according to the switch state of the barrier unit 114. On the other hand, at a time t2, the barrier unit 114 shields the pixels for displaying the original left-eye image L on the display panel 112 according to the driving timing. Herein the display panel 112 projects the right-eye image to the right eye of the viewer according to the switch state of the barrier unit 114. Thus, between the time t1 and t2, the left-eye image and the right-eye image respectively received by the viewer's left and right eyes are synthesized into a stereoscopic image in the viewer's brain through parallax.

To be specific, to respectively project the original left-eye image L and the original right-eye image R into the viewer's left and right eyes through the barrier unit 114, an image 1 mg needs to be generated by the display panel 112 by using the original left-eye image L and the original right-eye image R alternatively presented on the odd-column pixels P_od1-P_odn and the even-column pixels P_ev1-P_evn, as shown in FIG. 2. After that, the light incident angle is changed by the barrier unit 114 to project the portion related to the original left-eye image L and the portion related to the original right-eye image R in the image 1 mg respectively to the viewer's left and right eyes.

Conventionally, the left-eye image data and the right-eye image data are usually synthesized through software processing, and then the processed left- and right-eye image data is sequentially output to each pixel to display a stereoscopic image 1 mg. However, the display efficiency is reduced due to the extra image processing step. Besides, because an external host has to come with aforementioned software in order to allow an auto-stereoscopic 3D display to display stereoscopic images, the hardware compatibility of the conventional auto-stereoscopic 3D display is low.

Thereby, the auto-stereoscopic 3D display 100 can directly display the stereoscopic image 1 mg on the display panel 112 by respectively driving the odd-column pixels P_od1-P_odn and the even-column pixels P_ev1-P_evn. Because the software processing step is omitted, the compatibility of the auto-stereoscopic 3D display 100 is improved.

Figure 3:
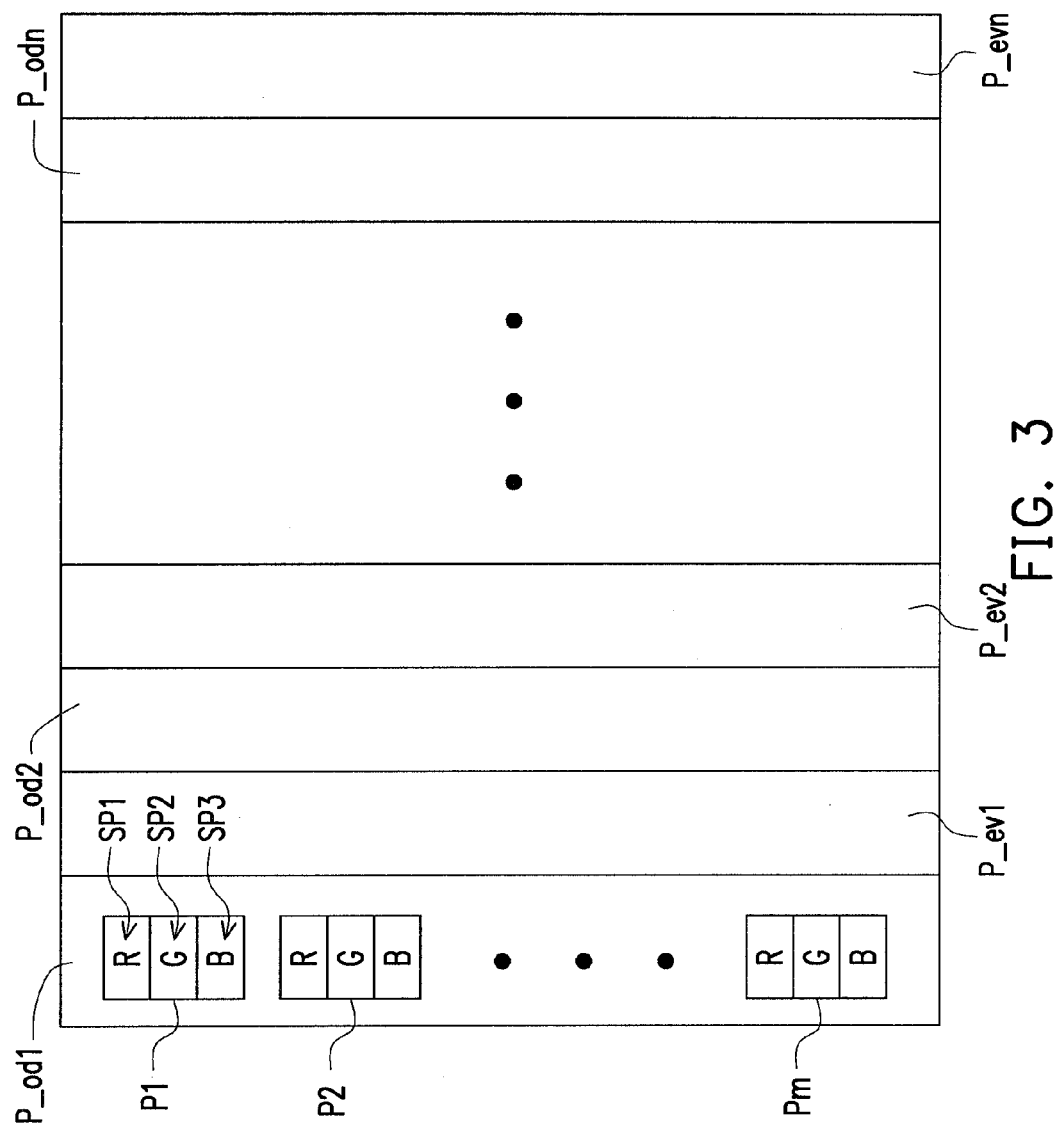
FIG. 3 is a diagram illustrating the pixel structure of a display panel according to an embodiment of the invention.

In addition, when a conventional display panel displays a stereoscopic image by using a barrier unit 114 implemented with a parallax barrier, color shift may be produced in the displayed stereoscopic image since sub-pixels of the same color are shielded at the same time. To compensate for the color shift, the pixel structure of a display panel is provided by the present embodiment, as shown in FIG. 3. FIG. 3 is a diagram illustrating the pixel structure of a display panel according to an embodiment of the invention.

Referring to FIG. 3, in the present embodiment, the difference between the display panel 312 and a conventional display panel falls on the arrangement of the sub-pixels. For example, the first odd-column pixel P_od1 includes pixels P1-Pm, and each of the pixels P1-Pm includes a first sub-pixel, a second sub-pixel, and a third sub-pixel. Herein the first sub-pixel sp1, the second sub-pixel sp2, and the third sub-pixel sp3 of the first pixel P1 will be described as an example. The first sub-pixel sp1 has a first color resistor R (for example, a red color resistor), the second sub-pixel sp2 has a second color resistor G (for example, a green color resistor), and the third sub-pixel sp3 has a third color resistor B (for example, a blue color resistor), and the first sub-pixel sp1, the second sub-pixel sp2, and the third sub-pixel sp3 are sequentially arranged in the column direction of the first odd-column pixel P_od1.

To be specific, regarding the sub-pixel arrangement of a conventional display panel, sub-pixels having different color resistors are usually sequentially arranged from left to right. For example, all the sub-pixels in the first column have first color resistors, all the sub-pixels in the second column have second color resistors, all the sub-pixels in the third column have third color resistors, and so on. However, because a parallax barrier shields the pixels in the same column on a display panel, regarding the sub-pixel arrangement of a conventional display panel, a parallax barrier may shield the same color resistors at the same time so that color shift is produced in an image displayed by the display panel.

In the display panel 312 of the present embodiment, the sub-pixels are sequentially arranged in the column direction. Thus, when the barriers b shield the light in the same column, they evenly shield the first sub-pixels sp1, the second sub-pixels sp2, and the third sub-pixels sp3 with the first color resistors R, the second color resistors G, and the third color resistors B. Thereby, the problem of color shift is resolved.

Figure 4:
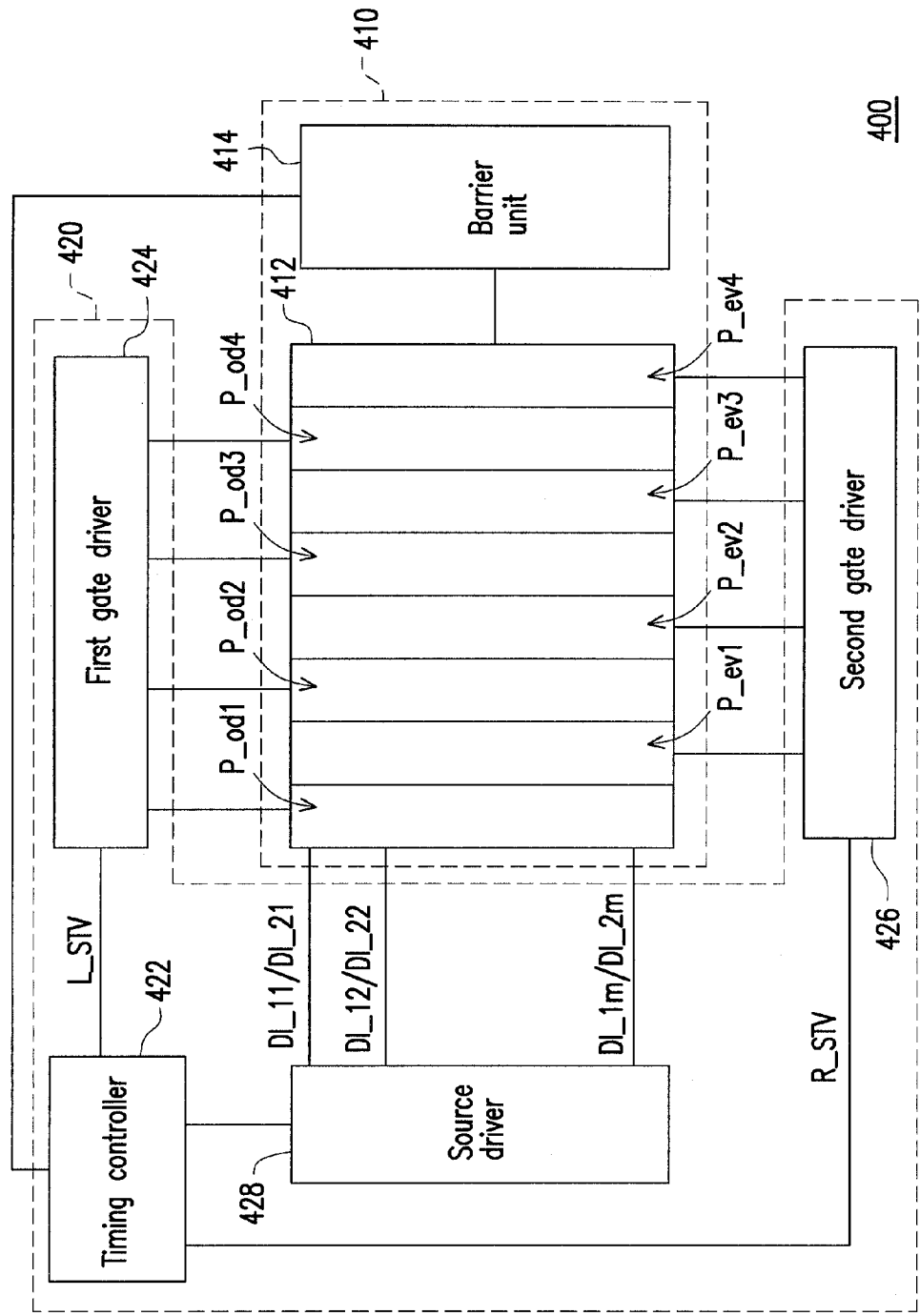
FIG. 4 is a diagram of an auto-stereoscopic 3D display according to another embodiment of the invention.

FIG. 4 is a diagram of an auto-stereoscopic 3D display according to another embodiment of the invention. Same as that illustrated in FIG. 1, the barrier unit 414 illustrated in FIG. 4 is only an example but not intended to limit the disposition thereof in the display module 410. The disposition of the barrier unit 414 can be referred to the barrier unit 114 illustrated in FIG. 2 or the barrier unit 314 illustrated in FIG. 3. However, the invention is not limited thereto.

Referring to FIG. 4, the auto-stereoscopic 3D display 400 includes a display module 410 and a driving module 420. For the convenience of description, herein the display panel 412 in the display module 410 is assumed to have 8 columns of pixels (including 4 odd columns of pixels and 4 even columns of pixels). In addition, the display module 410 is the same as the display modules described above therefore will not be described herein.

In the present embodiment, the driving module 420 includes a timing controller 422, a first gate driver 424, a second gate driver 426, and a source driver 428. The timing controller 422 generates at least one left-eye image start signal L_STV, at least one right-eye image start signal R_STV, at least one left-eye image clock signal L_CK, and at least one right-eye image clock signal R_CK. The first gate driver 424 is coupled to the odd-column pixels P_od1-P_od4 and the timing controller 422. The first gate driver 424 sequentially enables the odd-column pixels P_od1-P_od4 according to the left-eye image start signal L_STV and the left-eye image clock signal L_CK.

The second gate driver 426 is coupled to the even-column pixels P_ev1-P_ev4 and the timing controller 422. The second gate driver 426 sequentially enables the even-column pixels P_ev1-P_ev4 according to the right-eye image start signal R_STV and the right-eye image clock signal R_CK. The source driver 428 is coupled to the timing controller 422.

The source driver 428 outputs the left-eye image data DI_11-DI_1m to the odd-column pixels P_od1-P_od4 according to the left-eye image clock signal L_CK and outputs the right-eye image data DI_21-DI_2m to the even-column pixels P_ev1-P_ev4 according to the right-eye image clock signal R_CK.

To be specific, in the present embodiment, the driving module 420 sequentially enables the corresponding odd-column pixels P_od1-P_od4 and the even-column pixels P_ev1-P_ev4 respectively according to timing signals provided by the timing controller 422 by using two gate drivers (for example, the first gate driver 424 and the second gate driver 426), so as to allow the odd-column pixels P_od1-P_od4 and the even-column pixels P_ev1-P_ev4 to respectively receive the left-eye image data DI_11-DI_1m or the right-eye image data DI_21-DI_2m from the source driver 428 during frame periods of different driving timings. Thereby, the display module 410 can project a left-eye image and a right-eye image during corresponding frame periods, so as to present a stereoscopic image in a viewer's eyes, through simply hardware driving.

It should be mentioned that in an actual design, the first gate driver 424 and the second gate driver 426 may be a gate-driver on array. Namely, the first gate driver 424 and the second gate driver 426 are directly designed on the pixel array of the display panel instead of being coupled to the driving module 420 of the display panel. However, the invention is not limited thereto.

Below, the driving method of an auto-stereoscopic 3D display in the embodiments illustrated in FIGS. 1-4 will be further described with reference to the flowcharts and timing diagrams of driving signals in FIGS. 5-11.

Figure 5:
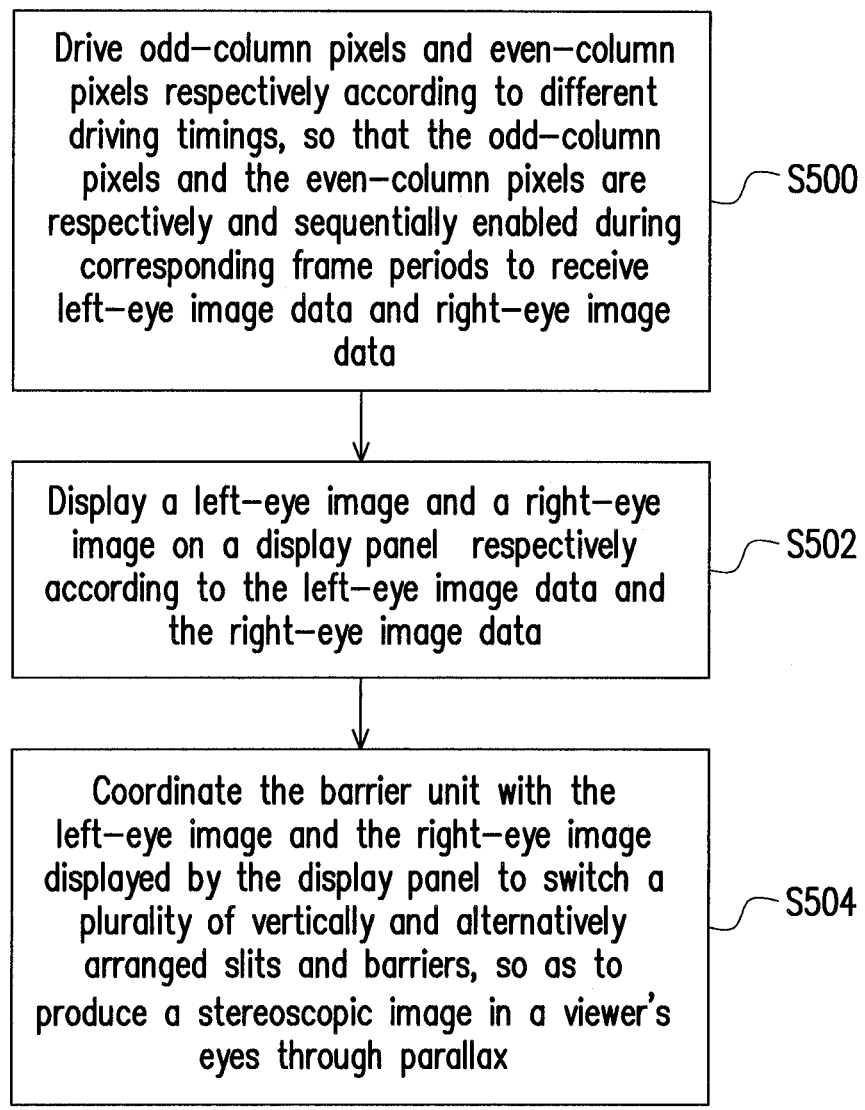
FIG. 5 is a flowchart of a driving method of an auto-stereoscopic 3D display according to an embodiment of the invention.

FIG. 5 is a flowchart of a driving method of an auto-stereoscopic 3D display according to an embodiment of the invention. Referring to FIG. 1, FIG. 2, and FIG. 5, first, the driving module 120 drives the odd-column pixels P_od1-P_odn and the even-column pixels P_ev1-P_evn respectively according to different driving timings, so that the odd-column pixels P_od1-P_odn and the even-column pixels P_ev1-P_evn are respectively and sequentially enabled during corresponding frame periods to receive the left-eye image data DI_11-DI_1m and the right-eye image data DI_21-DI_2m (step S500). Then, the driving module 120 controls the display panel 112 to generate a left-eye image and a right-eye image respectively according to the left-eye image data DI_11-DI_1m and the right-eye image data DI_21-DI_2m (step S502) and controls the barrier unit 114 to coordinate with the left-eye image and the right-eye image displayed by the display panel 112 and switch a plurality of vertically and alternatively arranged slits and barriers, so as to produce a stereoscopic image in the viewer's eyes through parallax (step S504).

Figure 6:
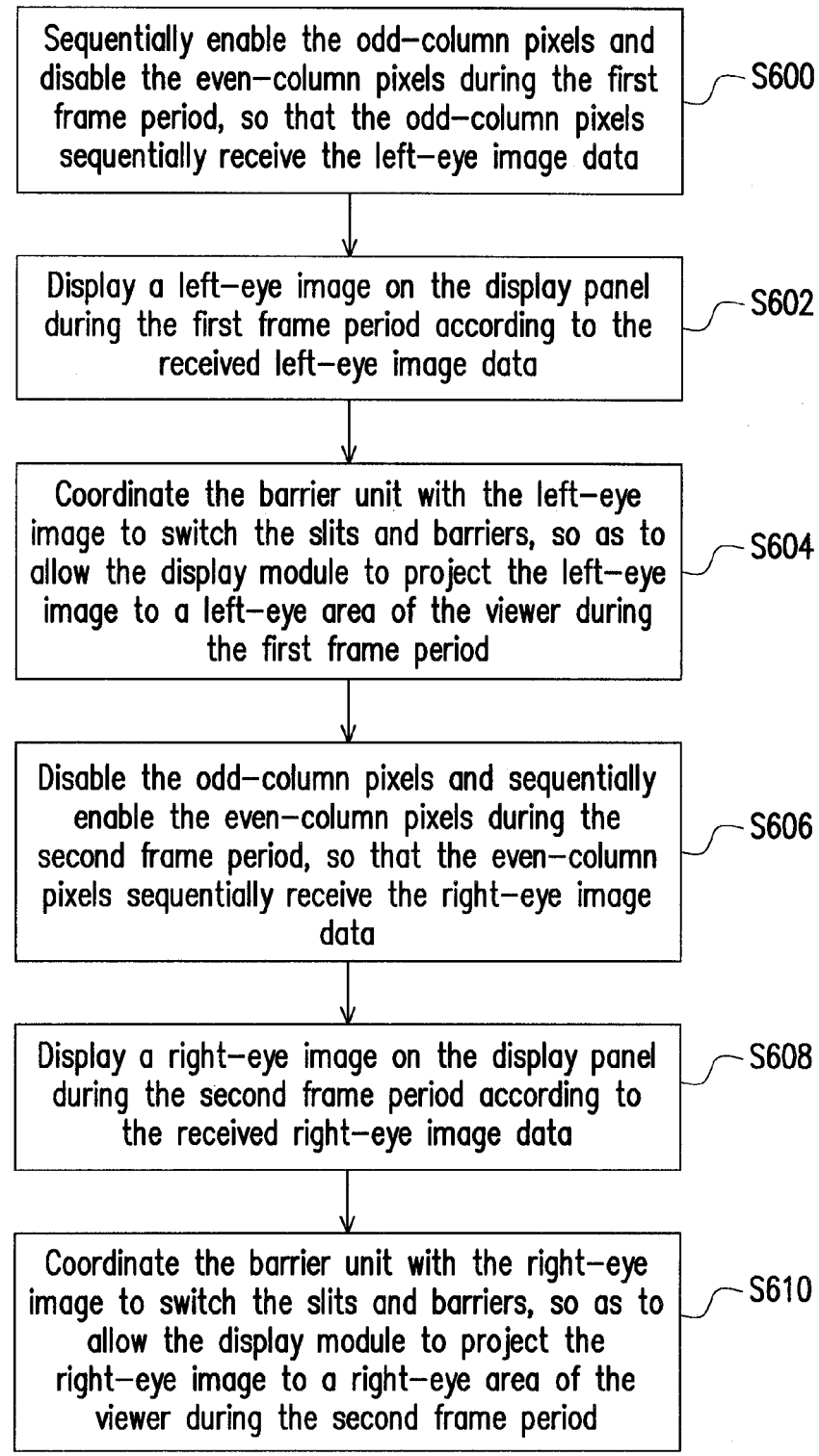
FIG. 6 is a flowchart of a driving method of an auto-stereoscopic 3D display according to another embodiment of the invention.

To be specific, aforementioned frame periods are assumed to be two adjacent frame periods (i.e., a first frame period and a second frame period). In this case, the driving method is as that illustrated in FIG. 6. FIG. 6 is a flowchart of a driving method of an auto-stereoscopic 3D display according to another embodiment of the invention.

Referring to both FIG. 1 and FIG. 6, first, the driving module 120 sequentially enables the odd-column pixels P_od1-P_odn and disables the even-column pixels P_ev1-P_evn during the first frame period, so that the odd-column pixels P_od1-P_odn sequentially receive the left-eye image data DI_11-DI_1m (step S600). Then, the driving module 120 controls the display panel 112 to display the left-eye image during the first frame period according to the received left-eye image data DI_11-DI_1m (step S602). Herein the driving module 120 provides synchronous driving timings to allow the barrier unit 114 to coordinate with the left-eye image and switch the slits and barriers, so that the display module 110 can project the left-eye image to a left-eye area of the viewer during the first frame period (step S604).

When the first frame period is over and the second frame period is entered, the driving module 120 disables the odd-column pixels P_od1-P_odn and sequentially enables the even-column pixels P_ev1-P_evn during the second frame period (step S606). Similarly, the even-column pixels P_ev1-P_evn sequentially receive the right-eye image data DI_21-DI_2m to allow the display panel 112 to display the right-eye image during the second frame period according to the received right-eye image data DI_21-DI_2m (step S608). Herein the driving module 120 controls the barrier unit 114 to coordinate with the right-eye image and switch the slits and barriers, so as to allow the display module 110 to project the right-eye image to a right-eye area of the viewer during the second frame period (step S610).

Thus, during the first frame period and the second frame period, the viewer observes the left-eye image and the right-eye image from the auto-stereoscopic 3D display 100 respectively through his/her left and right eyes. In other words, during the first frame period, the auto-stereoscopic 3D display 100 projects an original left-eye image to the left eye of the viewer and projects a black or white image (determined according to the type of the display panel) to the right eye of the viewer, and during the second frame period, the auto-stereoscopic 3D display 100 projects an original right-eye image to the right eye of the viewer and projects a black or white image to the left eye of the viewer, so that the image displayed by the auto-stereoscopic 3D display 100 is perceived as a stereoscopic image in the viewer's brain due to parallax.

Figure 7:
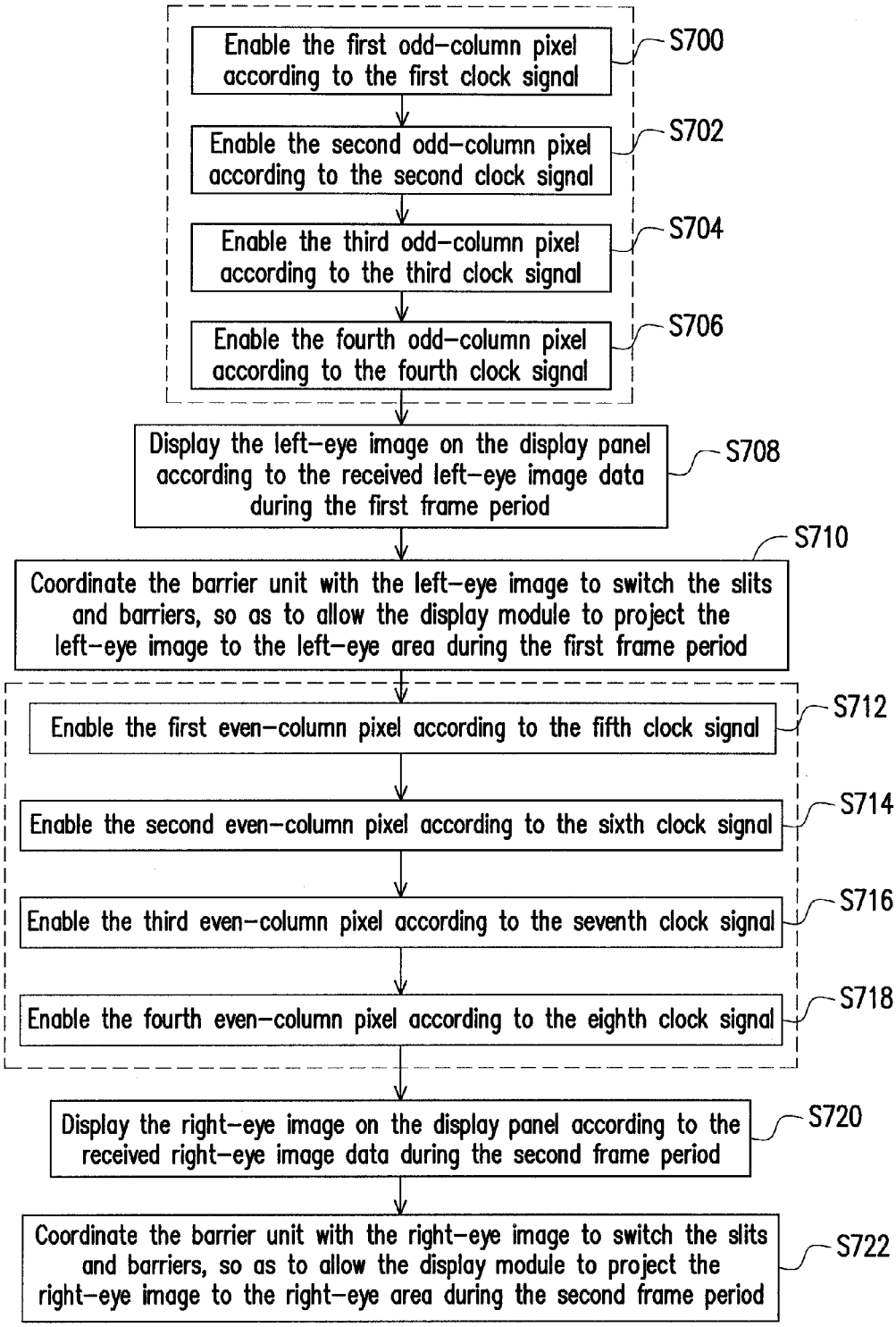
FIG. 7 is a flowchart of a driving method of an auto-stereoscopic 3D display according to yet another embodiment of the invention.
Figure 8:
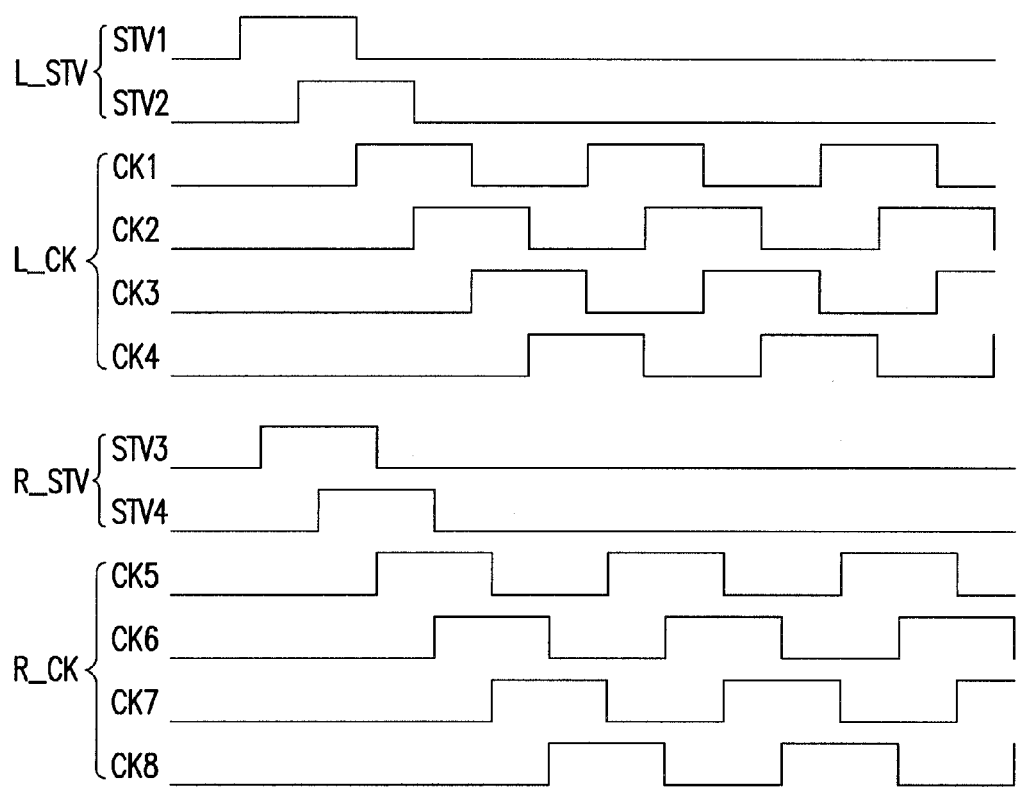
FIG. 8 is a driving timing diagram of an auto-stereoscopic 3D display according to an embodiment of the invention.

The driving method in the present embodiment will be further described with reference to the auto-stereoscopic 3D display in the embodiment illustrated in FIG. 4 and the timings of the driving signals thereof. FIG. 7 is a flowchart of a driving method of an auto-stereoscopic 3D display according to yet another embodiment of the invention. FIG. 8 is a driving timing diagram of an auto-stereoscopic 3D display according to an embodiment of the invention.

The driving method of the auto-stereoscopic 3D display 400 can be referred to both FIG. 4 and FIG. 7. First, the first gate driver 424 sequentially drives the odd-column pixels P_od1-P_od4 according to the left-eye image start signal L_STV and the left-eye image clock signal L_CK output by the timing controller 422 (steps S700-S706) to allow the odd-column pixels P_od1-P_od4 to sequentially receive the left-eye image data DI_11-DI_1m. Accordingly, the display panel 412 displays the left-eye image during the first frame period according to the received left-eye image data DI_11-DI_1m (step S708). Herein the barrier unit 414 coordinates with the left-eye image to switch the slits and barriers under the control of the timing controller 422, so that the display module 410 projects the left-eye image to the left-eye area of the viewer during the first frame period (step S710).

When the first frame period is over and the second frame period is entered, the timing controller 422 stops outputting the left-eye image start signal L_STV and the left-eye image clock signal L_CK and outputs the right-eye image start signal R_STV and the right-eye image clock signal R_CK instead. Thus, during the second frame period, the second gate driver 426 sequentially drives the even-column pixels P_ev1-P_ev4 according to the right-eye image start signal R_STV and the right-eye image clock signal R_CK output by the timing controller 422 (steps S712-S718) to allow the even-column pixels P_ev1-P_ev4 to sequentially receive the right-eye image data DI_21-DI_2m. Accordingly, the display panel 412 displays the right-eye image during the second frame period according to the received right-eye image data DI_21-DI_2m (step S720). Herein the barrier unit 414 coordinates with the left-eye image to switch the slits and barriers under the control of the timing controller 422, so that the display module 410 projects the right-eye image to the right-eye area of the viewer during the second frame period (step S710). Thus, during the first frame period and the second frame period, the viewer observes the left-eye image and the right-eye image from the auto-stereoscopic 3D display 100 respectively through his/her left eye and right eye therefore perceives a stereoscopic image through parallax.

Referring to both FIG. 4 and FIG. 8, in the present embodiment, the odd-column pixels P_od1-P_od4 includes a first odd-column pixel P_od1, a second odd-column pixel P_od2, a third odd-column pixel P_od3, and a fourth odd-column pixel P_od4. Besides, the even-column pixels P_ev1-P_ev4 includes a first even-column pixel P_ev1, a second even-column pixel P_ev2, a third even-column pixel P_ev3, and a fourth even-column pixel P_ev4.

The left-eye image start signal L_STV generated by the timing controller 422 includes a first start signal STV1 and a second start signal STV2. The left-eye image clock signal L_CK includes a first clock signal CK1, a second clock signal CK2, a third clock signal CK3, and a fourth clock signal CK4. The right-eye image start signal R_STV includes a third start signal STV3 and a fourth start signal STV4. The right-eye image clock signal R_CK includes a fifth clock signal CK5, a sixth clock signal CK6, a seventh clock signal CK7, and an eighth clock signal CK8.

To be specific, in order to allow each odd-column pixel to have a sufficient scan frequency, in the present embodiment, the timing controller 422 generates the corresponding first clock signal CK1 and third clock signal CK3 according to the first start signal STV1 and generates the corresponding second clock signal CK2 and fourth clock signal CK4 according to the second start signal STV2. Herein the first clock signal CK1 starts to generate pulses at fixed intervals at a falling edge of a pulse of the first start signal STV1, and the third clock signal CK3 starts to generate pulses at fixed intervals at the falling edge of the first pulse PU11 of the first clock signal CK1. In other words, in the present embodiment, the first clock signal CK1 and the third clock signal CK3 have a difference of ½ cycle.

On the other hand, the timing controller 422 generates the second clock signal CK2 and the fourth clock signal CK4 according to the second start signal STV2 through the same technique. Herein because the second start signal STV2 generates pulses after half of the pulse duration of the first start signal STV1 elapses, the second clock signal CK2 and the first clock signal CK1 have a difference of ¼ cycle, and the fourth clock signal CK4 and the third clock signal have a difference of ¼ cycle.

The even-column pixels P_ev1-P_ev4 are driven in a similar way as the odd-column pixels P_od1-P_od4. In the present embodiment, the timing controller 422 generates the corresponding fifth clock signal CK5 and seventh clock signal CK7 according to the third start signal STV3 and generates the corresponding sixth clock signal CK6 and eighth clock signal CK8 according to the fourth start signal STV4. Herein each of the fifth clock signal CK5 to the eighth clock signal CK8 has a difference of ¼ cycle to the previous clock signal.

It should be noted that the left-eye image start signal L_STV and the left-eye image clock signal L_CK and the right-eye image start signal R_STV and the right-eye image clock signal R_CK are illustrated on the same coordinate axis in FIG. 8. However, the waveforms of the left-eye image start signal L_STV and the left-eye image clock signal L_CK and the right-eye image start signal R_STV and the right-eye image clock signal R_CK illustrated in FIG. 8 are only examples. In FIG. 8, except that there is a correspondence between the timing of the left-eye image start signal L_STV and the timing of the left-eye image clock signal L_CK and there is a correspondence between the timing of the right-eye image start signal R_STV and the timing of the right-eye image clock signal R_CK, the correspondence between the timings of the driving signals of the left-eye image and the right-eye image is not limited to that illustrated in FIG. 8.

Figure 9:
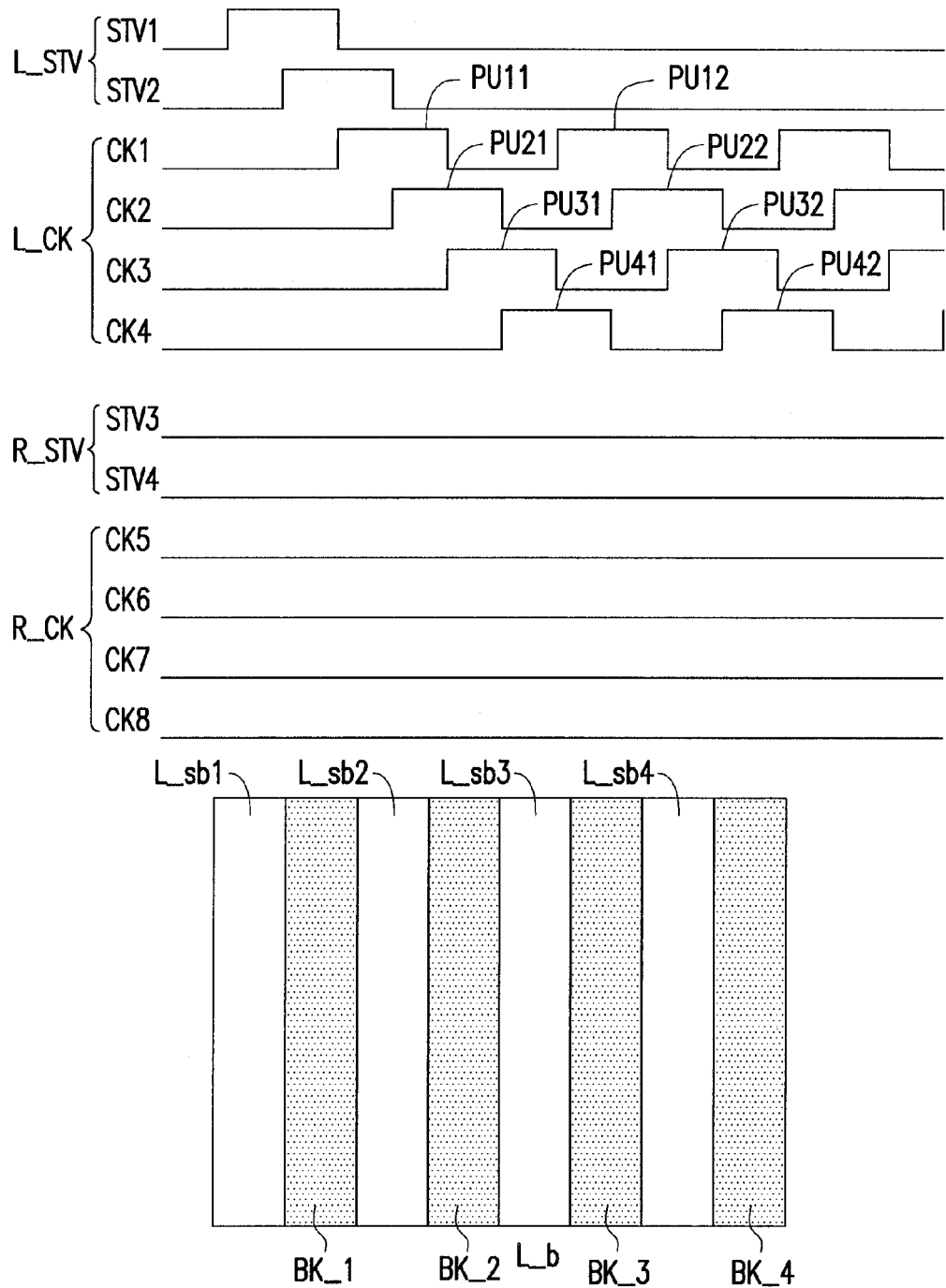
FIG. 9 is a driving diagram of a first frame period according to an embodiment of the invention.

Below, how the odd-column pixels P_od1-P_od4 and the even-column pixels P_ev1-P_ev4 are sequentially driven will be respectively explained with reference to the timings of driving signals in the auto-stereoscopic 3D display 400 during the first frame period and the second frame period. First, during the first frame period, the timings of driving signals in the auto-stereoscopic 3D display 400 are as shown in FIG. 9. FIG. 9 is a driving diagram of a first frame period according to an embodiment of the invention.

Referring to FIG. 4, FIG. 7, and FIG. 9, during the first frame period, the timing controller 422 outputs left-eye image start signals (for example, the first start signal STV1 and the second start signal STV2) and left-eye image clock signals (for example, the first clock signal CK1, the second clock signal CK2, the third clock signal CK3, and the fourth clock signal CK4) and stops outputting right-eye image start signals (for example, the third start signal STV3 and the fourth start signal STV4) and right-eye image clock signals (for example, the fifth clock signal CK5, the sixth clock signal CK6, the seventh clock signal CK7, and the eighth clock signal CK8). Thus, the even-column pixels P_ev1-P_ev4 are disabled and display the black stripes bk_1-bk_4 in the left-eye image L_b. Herein the image displayed by the disabled even-column pixels P_ev1-P_ev4 is generated according to the design of the display panel 412, and the invention is not limited thereto. In other embodiments, white stripes may also be displayed by the disabled even-column pixels P_ev1-P_ev4.

When the driving module 420 drives the odd-column pixels P_od1-P_od4 during the first frame period, the first gate driver 424 sequentially enables the first odd-column pixel P_od1 according to the first clock signal CK1 (step S700), enables the second odd-column pixel P_od2 according to the second clock signal CK2 (step S702), enables the third odd-column pixel P_od3 according to the third clock signal CK3 (step S704), and enables the fourth odd-column pixel P_od4 according to the fourth clock signal CK4 (step S706) during the first frame period.

To be specific, when the clock signals CK1-CK4 sequentially generate pulses, the corresponding odd-column pixels P_od1-P_od4 are sequentially enabled and receive the corresponding left-eye image data DI_11-DI_1m. For example, in step S702, when the first clock signal CK1 generates a pulse PU11, the first gate driver 424 outputs the pulse PU11 to enable the first odd-column pixel P_od1, so that the first odd-column pixel P_od1 receives the corresponding left-eye image data DI_11-DI_1m and displays the corresponding partial left-eye image L_sb1 according to the received left-eye image data DI_11-DI_1m.

Similarly, when the first gate driver 424 respectively and sequentially outputs pulses PU21, PU31, and PU41 to the odd-column pixels P_od2-P_od4, the odd-column pixels P_od2-P_od4 are sequentially enabled to receive the corresponding left-eye image data DI_11-DI_1m and respectively display the corresponding partial left-eye images L_sb2-

L_sb4 according to the received left-eye image data DI_11-DI_1m. Herein the display panel 412 can display the left-eye image Lb according to the received left-eye image data DI_11-DI_1m during the first frame period (step S710). The left-eye image Lb is alternatively composed of the partial left-eye images L_sb1-L_sb4 and black stripe images bk_1-bk_4, and the partial left-eye images L_sb1-L_sb4 can be synthesized into the original left-eye image.

Figure 10:
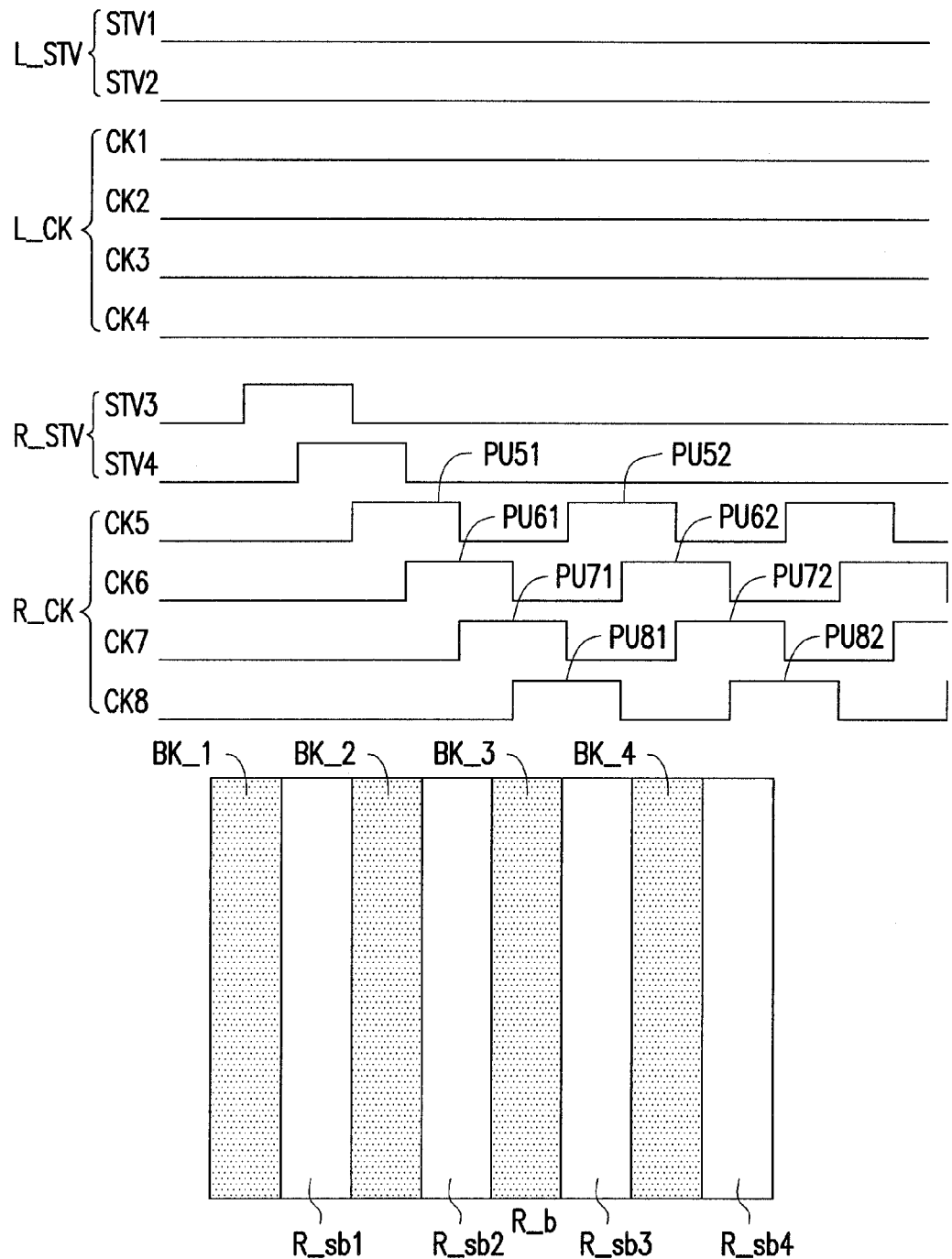
FIG. 10 is a driving diagram of a second frame period according to an embodiment of the invention.

When the first frame period is over and the second frame period is entered, the timings of the driving signals are as shown in FIG. 10. FIG. 10 is a driving diagram of a second frame period according to an embodiment of the invention.

Referring to FIG. 4, FIG. 7, and FIG. 10, during the second frame period, the timing controller 422 stops outputting the left-eye image start signals (for example, the first start signal STV1 and the second start signal STV2) and the left-eye image clock signals (for example, the first clock signal CK1, the second clock signal CK2, the third clock signal CK3, and the fourth clock signal CK4) and outputs the right-eye image start signals (for example, the third start signal STV3 and the fourth start signal STV4) and the right-eye image clock signals (for example, the fifth clock signal CK5, the sixth clock signal CK6, the seventh clock signal CK7, and the eighth clock signal CK8) instead. Thus, the odd-column pixels P_od1-P_od4 are disabled and display the black stripes bk_1-bk_4 in the right-eye image R_b. Herein the images displayed by the disabled odd-column pixels P_od1-P_od4 are generated according to the design of the display panel 412, and the invention is not limited thereto. In other embodiments, white stripes may also be displayed by the disabled odd-column pixels P_od1-P_od4.

When the driving module 420 drives the even-column pixels P_ev1-P_ev4 during the second frame period, the second gate driver 426 sequentially enables the first even-column pixel P_ev1 according to the fifth clock signal CK5 (step S712), enables the second even-column pixel P_ev2 according to the sixth clock signal CK6 (step S714), enables the third even-column pixel P_ev3 according to the seventh clock signal CK7 (step S716), and enables the fourth even-column pixel P_ev4 according to the eighth clock signal CK8 (step S718) during the second frame period.

To be specific, when the clock signals CK5-CK8 sequentially generate pulses, the corresponding even-column pixels P_ev1-P_ev4 are sequentially enabled and receive the corresponding right-eye image data DI_21-DI_2m. For example, in step S712, when the fifth clock signal CK5 generates a pulse PU51, the second gate driver 426 outputs the pulse PU51 to enable the first even-column pixel P_ev1, so that the first even-column pixel P_ev1 receives the corresponding right-eye image data DI_21-DI_2m and displays the corresponding partial right-eye image R_sb1 according to the received right-eye image data DI_21-DI_2m.

Similarly, when the second gate driver 426 respectively and sequentially outputs pulses PU61, PU71, and PU81 to the even-column pixels P_ev2-P_ev4, the even-column pixels P_ev2-P_ev4 are sequentially enabled to receive the corresponding right-eye image data DI_21-DI_2m and respectively display the corresponding partial right-eye images R_sb2-R_sb4 according to the received right-eye image data DI_21-DI_2m. Herein the display panel 412 can display the right-eye image R_b according to the received right-eye image data DI_21-DI_2m during the second frame period (step S720). The right-eye image R_b is alternatively composed of the partial right-eye images R_sb1-R_sb4 and black stripe images bk_1-bk_4, and the partial right-eye images R_sb1-R_sb4 can be synthesized into the original right-eye image.

In the present embodiment, it is assumed that the display panel has 8 columns of pixels (4 odd columns of pixels and 4 even columns of pixels). However, the invention is not limited thereto, and the driving method described above can be applied regardless of the column number of pixels on the display panel. For example, referring to FIG. 4 and FIG. 9 again, when there are more odd columns of pixels, the first gate driver 424 further enables the fifth odd-column pixel according to the pulse PU12 of the first clock signal CK1, enables the sixth odd-column pixel according to the pulse PU22 of the second clock signal CK2, enables the seventh odd-column pixel according to the pulse PU32 of the third clock signal CK3, enables the eighth odd-column pixel according to the pulse PU42 of the fourth clock signal CK4, . . . , and so on. Similarly, the second gate driver 426 enables the fifth even-column pixel according to the pulse PU52 of the fifth clock signal CK5, enables the sixth even-column pixel according to the pulse PU62 of the sixth clock signal CK6, enables the seventh even-column pixel according to the pulse PU72 of the seventh clock signal CK7, enables the eighth even-column pixel according to the pulse PU82 of the eighth clock signal CK8, . . . , and so on.

In other words, in a display panel with a plurality of columns of pixels, regarding the driving of the odd-column pixels, the first gate driver 424 controls the on/off of the pixels in the $1^{st}$, $9^{th}$, . . . , and $(8k-7)^{th}$ columns according to the first clock signal CK1, controls the on/off of the pixels in the $3^{rd}$, $11^{th}$, and $(8k-5)^{th}$ columns according to the second clock signal CK2, controls the on/off of the pixels in the $5^{th}$, $13^{th}$, . . . , and $(8k-3)^{th}$ columns according to the third clock signal CK3, and controls the on/off of the pixels in the $7^{th}$, $15^{th}$, . . . , and $(8k-1)^{th}$ columns according to the fourth clock signal CK4. Herein k is positive integer.

On the other hand, regarding the driving of the even-column pixels, the second gate driver 426 controls the on/off of the pixels in the $2^{nd}$, $10^{th}$, . . . , and $(8k-6)^{th}$ columns according to the fifth clock signal CK5, controls the on/off of the pixels in the $4^{th}$, $12^{th}$, . . . , and $(8k-4)^{th}$ columns according to the sixth clock signal CK6, controls the on/off of the pixels in the $6^{th}$, $14^{th}$, . . . , and $(8k-2)^{th}$ columns according to the seventh clock signal CK7, and controls the on/off of the pixels in the $8^{th}$, $16^{th}$, . . . , and $8k^{th}$ columns according to the eighth clock signal CK8.

Figure 11:
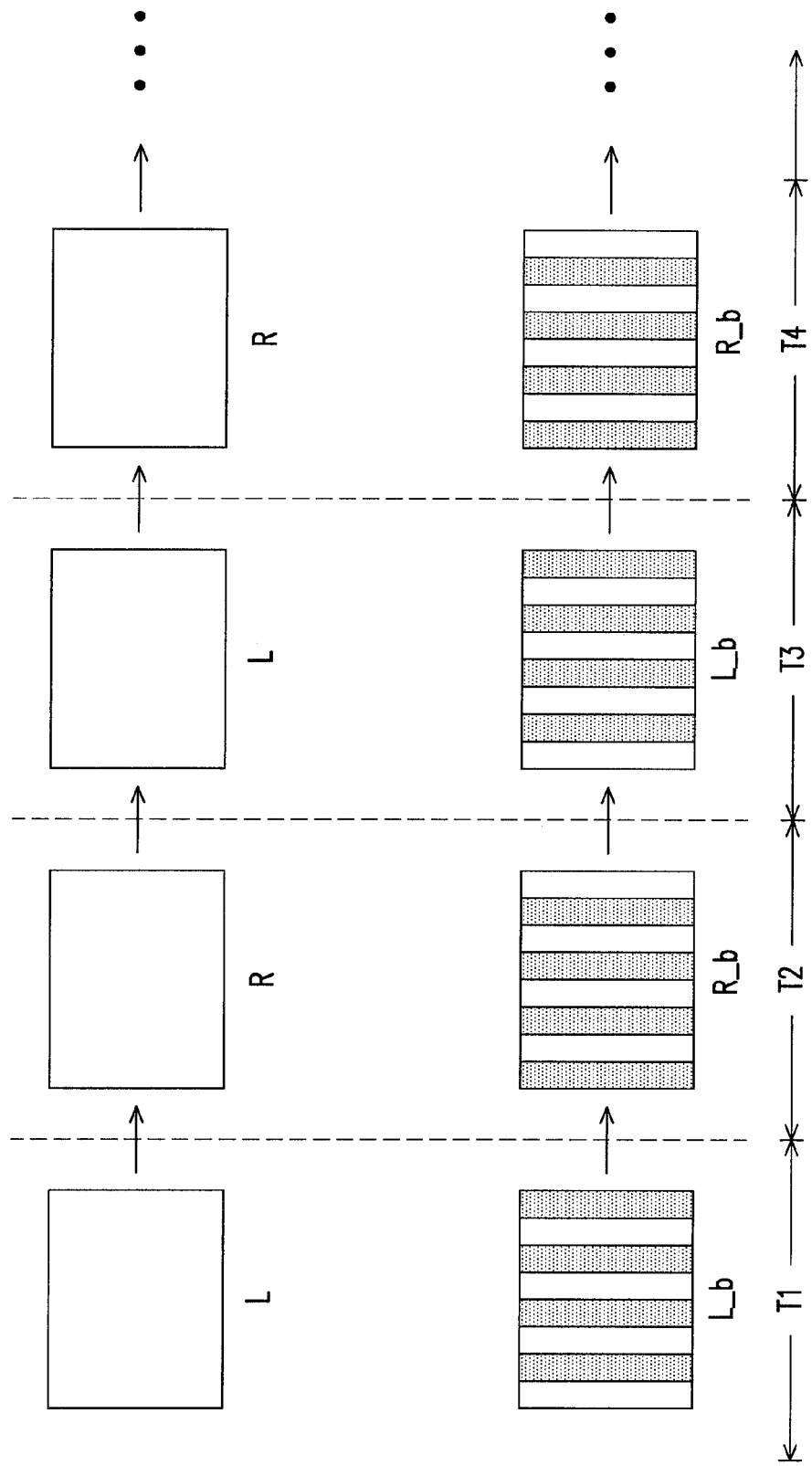
FIG. 11 is a driving diagram of an auto-stereoscopic 3D display according to an embodiment of the invention.

FIG. 11 is a driving diagram of an auto-stereoscopic 3D display according to an embodiment of the invention. Substantially, the left-eye image data DI_11-DI_1m is corresponding to an original left-eye image L, and the right-eye image data DI_21-DI_2m is corresponding to an original right-eye image R.

Referring to both FIG. 4 and FIG. 11, during the first frame period T1, the auto-stereoscopic 3D display 400 drives the odd-column pixels P_od1-P_od4 on the display panel 412 through the first gate driver 424 and the source driver 428, so that the display panel 412 generates a left-eye image L_b alternatively composed of an original left-eye image L and black stripe images according to the left-eye image data DI_11-DI_1m. Herein the barrier unit 414 switches the slits and barriers under the synchronous control of the timing controller, so that the display module 410 projects the image presented by the odd-column pixels P_od1-P_od4 in the left-eye image L_b to the left-eye area of a viewer through the barrier unit 414 (accordingly, the left eye of the viewer observes the original left-eye image L during the first frame period T1) and projects the black stripe images to the right-eye area of the viewer through the barrier unit 414 (accordingly, the right eye of the viewer observes a black image during the first frame period T1).

Next, during the second frame period T2, the auto-stereoscopic 3D display 400 drives the even-column pixels P_ev1-P_ev4 on the display panel 412 through the second gate driver 426 and the source driver 428, so that the display panel 412 generates a right-eye image R_b alternatively composed of an original right-eye image R and black stripe images according to the right-eye image data DI_21-DI_2m.

Similarly, the barrier unit 414 switches the slits and barriers under the synchronous control of the timing controller, so that the display module 410 projects the image presented by the even-column pixels P_ev1-P_ev4 in the right-eye image R_b to the right-eye area of the viewer through the barrier unit 414 (accordingly, the right eye of the viewer observes the original right-eye image R during the second frame period T2) and projects the black stripe images to the left-eye area of the viewer through the barrier unit 414 (accordingly, the left eye of the viewer observes a black image during the second frame period T2).

If the first frame period T1 and the second frame period T2 are short enough, a parallax effect is produced by the original left-eye image and the original right-eye image in the left and right eyes of the viewer, so that the viewer can perceive the image displayed by the auto-stereoscopic 3D display 400 during the first frame period T1 and the second frame period T2 as a stereoscopic image. In other words, the frame period for displaying the stereoscopic image is actually the first frame period T1 plus the second frame period T2 (i.e., a frame of the stereoscopic image is displayed during the first frame period T1 and the second frame period T2). Thus, the first frame period T1 and the second frame period T2 can be considered two sub-frame periods for displaying the stereoscopic image. The next frame of the stereoscopic image is displayed during the third frame period T3 and the fourth frame period T4 through the driving method described above. Subsequent driving timings can be deduced accordingly therefore will not be described herein.

As described above, embodiments of the invention provide an auto-stereoscopic 3D display and a driving method thereof. In the driving method, odd-column pixels and even-column pixels are driven respectively according to different driving timings. Thus, no software for synthesizing left-eye image and right eye image is required, and a display panel of the auto-stereoscopic 3D display can be driven by a driving module to directly generate an image format for displaying stereoscopic images, so that high hardware compatibility is achieved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An auto-stereoscopic three-dimensional (3D) display, comprising:
    a display module, comprising a display panel and a barrier unit, wherein the display panel has a plurality of odd-column pixels and a plurality of even-column pixels, and the barrier unit coordinates with a left-eye image and a right-eye image displayed by the display panel to switch a plurality of vertically and alternatively arranged slits and barriers, so as to produce a stereoscopic image through parallax in a left eye and a right eye; and
    a driving module, coupled to the display module, and providing a plurality of left-eye image data and a plurality of right-eye image data to drive the display module,
    wherein the driving module drives the odd-column pixels and the even-column pixels respectively according to different driving timings to respectively and sequentially enable the odd-column pixels and the even-column pixels during a plurality of corresponding frame periods and allow the odd-column pixels and the even-column pixels to receive the left-eye image data and the right-eye image data, so as to allow the display panel to display the left-eye image and the right-eye image,
    wherein the driving module comprises:
    a timing controller, generating at least one left-eye image start signal, at least one right-eye image start signal, at least one left-eye image clock signal, and at least one right-eye image clock signal;
    a first gate driver, coupled to the odd-column pixels and the timing controller, and sequentially enabling the odd-column pixels according to the at least one left-eye image start signal and the at least one left-eye image clock signal;
    a second gate driver, coupled to the even-column pixels and the timing controller, and sequentially enabling the even-column pixels according to the at least one right-eye image start signal and the at least one right-eye image clock signal; and
    a source driver, coupled to the timing controller, outputting the left-eye image data to the odd-column pixels according to the at least one left-eye image clock signal, and outputting the right-eye image data to the even-column pixels according to the at least one right-eye image clock signal.

2. The auto-stereoscopic 3D display according to claim 1, wherein the frame periods comprise a first frame period and a second frame period,
    wherein the driving module sequentially enables the odd-column pixels and disables the even-column pixels during the first frame period to allow the odd-column pixels to sequentially receive the left-eye image data and allow the display panel to display the left-eye image according to the left-eye image data during the first frame period, so as to allow the barrier unit to coordinate with the left-eye image to switch the slits and barriers and allow the display module to project the left-eye image to a left-eye area during the first frame period,
    wherein the driving module disables the odd-column pixels and sequentially enables the even-column pixels during the second frame period to allow the even-column pixels to sequentially receive the right-eye image data and allow the display panel to display the right-eye image according to the right-eye image data during the second frame period, so as to allow the barrier unit to coordinate with the right-eye image to switch the slits and barriers and allow the display module to project the right-eye image to a right-eye area during the second frame period.

3. The auto-stereoscopic 3D display according to claim 1, wherein the at least one left-eye image start signal comprises a first start signal and a second start signal, and the at least one left-eye image clock signal comprises a first clock signal, a second clock signal, a third clock signal, and a fourth clock signal, wherein the timing controller generates the first clock signal and the third clock signal according to the first start signal and generates the second clock signal and the fourth clock signal according to the second start signal.

4. The auto-stereoscopic 3D display according to claim 3, wherein the odd-column pixels comprise a first odd-column pixel, a second odd-column pixel, a third odd-column pixel, and a fourth odd-column pixel, and the first gate driver sequentially enables the first odd-column pixel according to the first clock signal, enables the second odd-column pixel according to the second clock signal, enables the third odd-column pixel according to the third clock signal, and enables the fourth odd-column pixel according to the fourth clock signal during a first frame period.

5. The auto-stereoscopic 3D display according to claim 3, wherein the at least one right-eye image start signal comprises a third start signal and a fourth start signal, and the at least one right-eye image clock signal comprises a fifth clock signal, a sixth clock signal, a seventh clock signal, and an eighth clock signal,
wherein the timing controller generates the fifth clock signal and the seventh clock signal according to the third start signal and generates the sixth clock signal and the eighth clock signal according to the fourth start signal.

6. The auto-stereoscopic 3D display according to claim 5, wherein the even-column pixels comprise a first even-column pixel, a second even-column pixel, a third even-column pixel, and a fourth even-column pixel, and the second gate driver sequentially enables the first even-column pixel according to the fifth clock signal, enables the second even-column pixel according to the sixth clock signal, enables the third even-column pixel according to the seventh clock signal, and enables the fourth even-column pixel according to the eighth clock signal during a second frame period.

7. The auto-stereoscopic 3D display according to claim 1, wherein the first gate driver and the second gate driver are a gate-driver on array.

8. The auto-stereoscopic 3D display according to claim 1, wherein each of the odd-column pixels and each of the even-column pixels respectively comprise:
a plurality of pixels, wherein each of the pixels comprises a first sub-pixel, a second sub-pixel, and a third sub-pixel, the first sub-pixel has a first color resistor, the second sub-pixel has a second color resistor, the third sub-pixel has a third color resistor, and the first sub-pixel, the second sub-pixel, and the third sub-pixel are sequentially arranged along a column direction of the odd-column pixels and the even-column pixels.

9. A driving method of an auto-stereoscopic 3D display, wherein the auto-stereoscopic 3D display comprises a display module, the display module comprises a display panel and a barrier unit, and the display panel has a plurality of odd-column pixels and a plurality of even-column pixels, the driving method comprising:
driving the odd-column pixels and the even-column pixels respectively according to different driving timings to respectively and sequentially enable the odd-column pixels and the even-column pixels during a plurality of corresponding frame periods, so as to allow the odd-column pixels and the even-column pixels to receive a plurality of left-eye image data and a plurality of right-eye image data;
displaying a left-eye image and a right-eye image on the display panel respectively according to the left-eye image data and the right-eye image data; and
coordinating with the left-eye image and the right-eye image displayed on the display panel by using the barrier unit to switch a plurality of vertically and alternatively arranged slits and barriers, so as to produce a stereoscopic image through parallax in a left eye and a right eye;
wherein the display further comprising a driving module; wherein the driving module comprises:
a timing controller, generating at least one left-eye image start signal, at least one right-eye image start signal, at least one left-eye image clock signal, and at least one right-eye image clock signal;
a first gate driver, coupled to the odd-column pixels and the timing controller, and sequentially enabling the odd-column pixels according to the at least one left-eye image start signal and the at least one left-eye image clock signal;
a second gate driver, coupled to the even-column pixels and the timing controller, and sequentially enabling the even-column pixels according to the at least one right-eye image start signal and the at least one right-eye image clock signal;
and a source driver, coupled to the timing controller, outputting the left-eye image data to the odd-column pixels according to the at least one left-eye image clock signal, and outputting the right-eye image data to the even-column pixels according to the at least one right-eye image clock signal.

10. The driving method according to claim 9, wherein the frame periods comprise a first frame period and a second frame period, and the step of driving the odd-column pixels and the even-column pixels respectively according to different driving timings comprises:
sequentially enabling the odd-column pixels and disabling the even-column pixels during the first frame period to allow the odd-column pixels to sequentially receive the left-eye image data; and
disabling the odd-column pixels and sequentially enabling the even-column pixels during the second frame period to allow the even-column pixels to sequentially receive the right-eye image data.

11. The driving method according to claim 10, wherein the step of sequentially enabling the odd-column pixels and disabling the even-column pixels during the first frame period comprises:
sequentially enabling the odd-column pixels according to at least one left-eye image start signal and at least one left-eye image clock signal.

12. The driving method according to claim 11, wherein the odd-column pixels comprises a first odd-column pixel, a second odd-column pixel, a third odd-column pixel, and a fourth odd-column pixel, the at least one left-eye image start signal comprises a first start signal and a second start signal, the at least one left-eye image clock signal comprises a first clock signal, a second clock signal, a third clock signal, and a fourth clock signal, and the step of sequentially enabling the odd-column pixels according to the at least one left-eye image start signal and the at least one left-eye image clock signal during the first frame period comprises:
enabling the first odd-column pixel according to the first clock signal;
enabling the second odd-column pixel according to the second clock signal;
enabling the third odd-column pixel according to the third clock signal; and
enabling the fourth odd-column pixel according to the fourth clock signal, wherein the first clock signal and the third clock signal are generated according to the first start signal, and the second clock signal and the fourth clock signal are generated according to the second start signal.

13. The driving method according to claim 10, wherein the step of disabling the odd-column pixels and sequentially enabling the even-column pixels during the second frame period comprises:

sequentially enabling the even-column pixels according to at least one right-eye image start signal and at least one right-eye image clock signal.

14. The driving method according to claim 13, wherein the even-column pixels comprise a first even-column pixel, a second even-column pixel, a third even-column pixel, and a fourth even-column pixel, the at least one right-eye image start signal comprises a third start signal and a fourth start signal, the at least one right-eye image clock signal comprises a fifth clock signal, a sixth clock signal, a seventh clock signal, and an eighth clock signal, and the step of sequentially enabling the even-column pixels according to the at least one right-eye image start signal and the at least one right-eye image clock signal during the second frame period comprises:

enabling the first even-column pixel according to the fifth clock signal;
enabling the second even-column pixel according to the sixth clock signal;
enabling the third even-column pixel according to the seventh clock signal; and
enabling the fourth even-column pixel according to the eighth clock signal, wherein the fifth clock signal and the seventh clock signal are generated according to the third start signal, and the sixth clock signal and the eighth clock signal are generated according to the fourth start signal.

15. The driving method according to claim 10, wherein the step of displaying the left-eye image and the right-eye image on the display panel respectively according to the left-eye image data and the right-eye image data comprises:

displaying the left-eye image on the display panel during the first frame period according to the left-eye image data; and
displaying the right-eye image on the display panel during the second frame period according to the right-eye image data.

16. The driving method according to claim 15, wherein the step of coordinating with the left-eye image and the right-eye image displayed on the display panel by using the barrier unit to switch the slits and barriers, so as to produce a stereoscopic image through parallax in the left eye and the right eye comprises:

coordinating with the left-eye image by using the barrier unit to switch the slits and barriers, so as to allow the display module to project the left-eye image to a left-eye area during the first frame period; and
coordinating with the right-eye image by using the barrier unit to switch the slits and barriers, so as to allow the display module to project the right-eye image to a right-eye area during the second frame period.

* * * * *